Nov. 15, 1960  L. C. SMITH ET AL  2,959,957
TENSILE TESTING APPARATUS
Filed Feb. 2, 1959  3 Sheets-Sheet 1
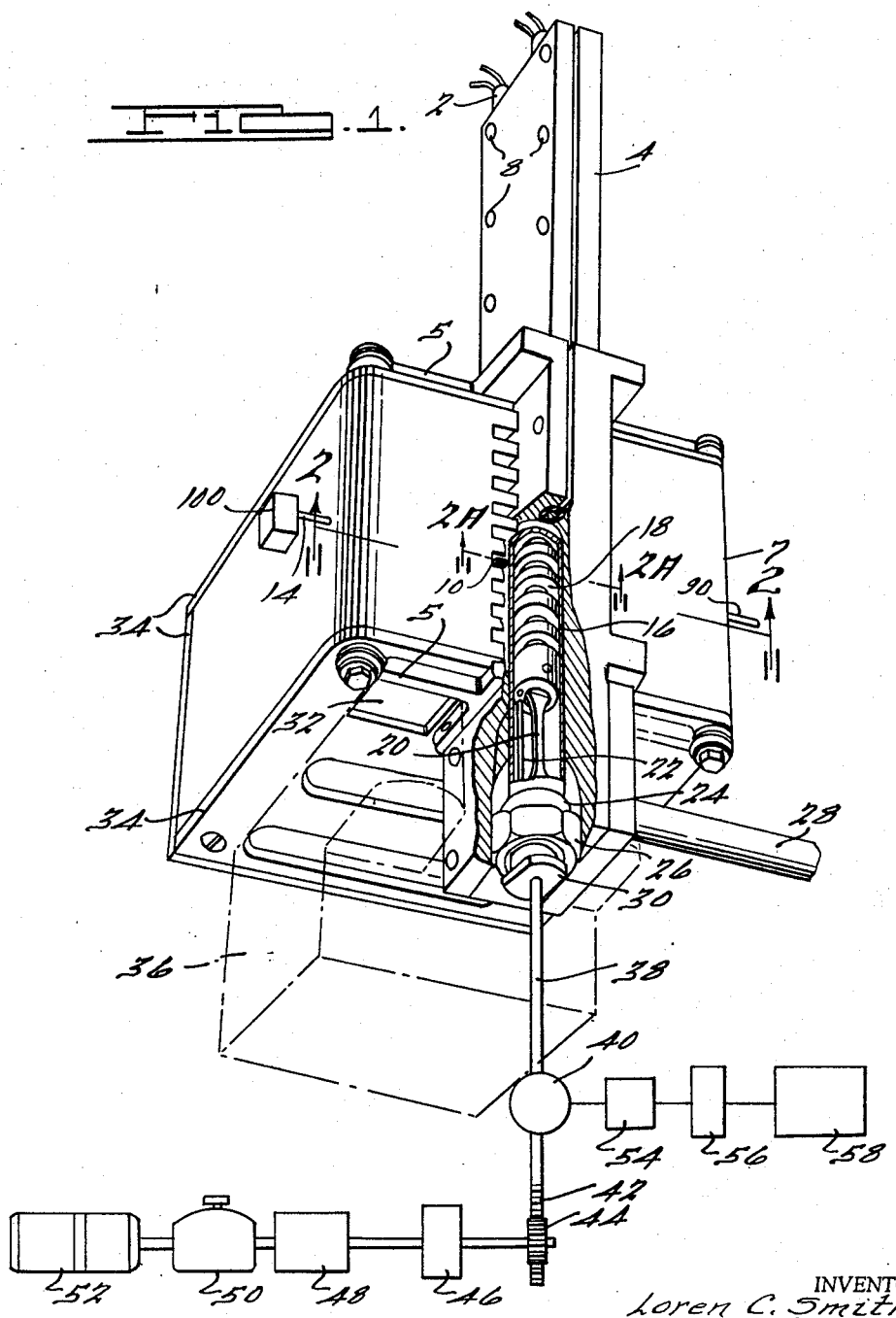
INVENTORS.
Loren C. Smith,
Harold R. Tyler.
BY
Donald Diamond
ATTORNEY.

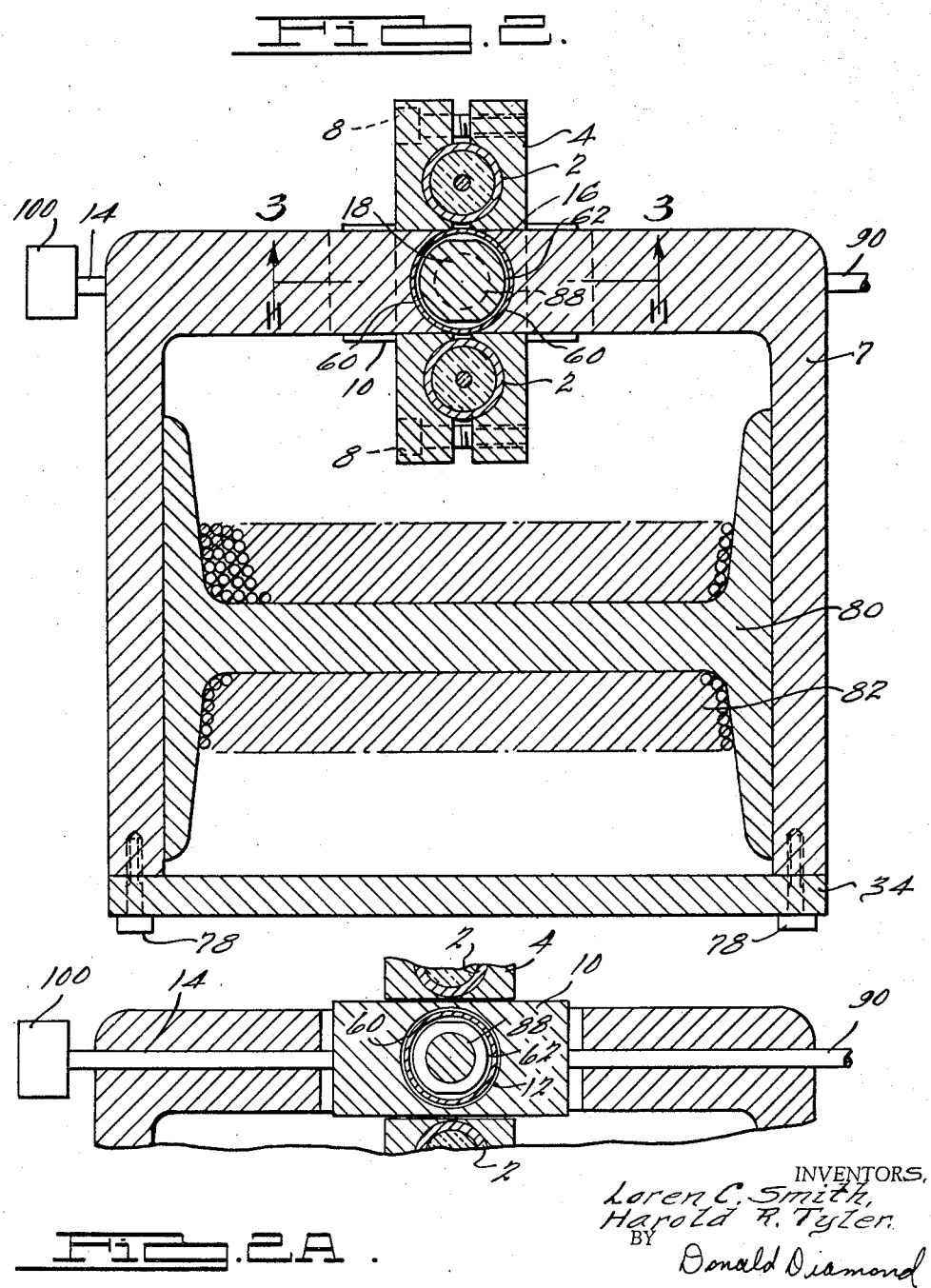

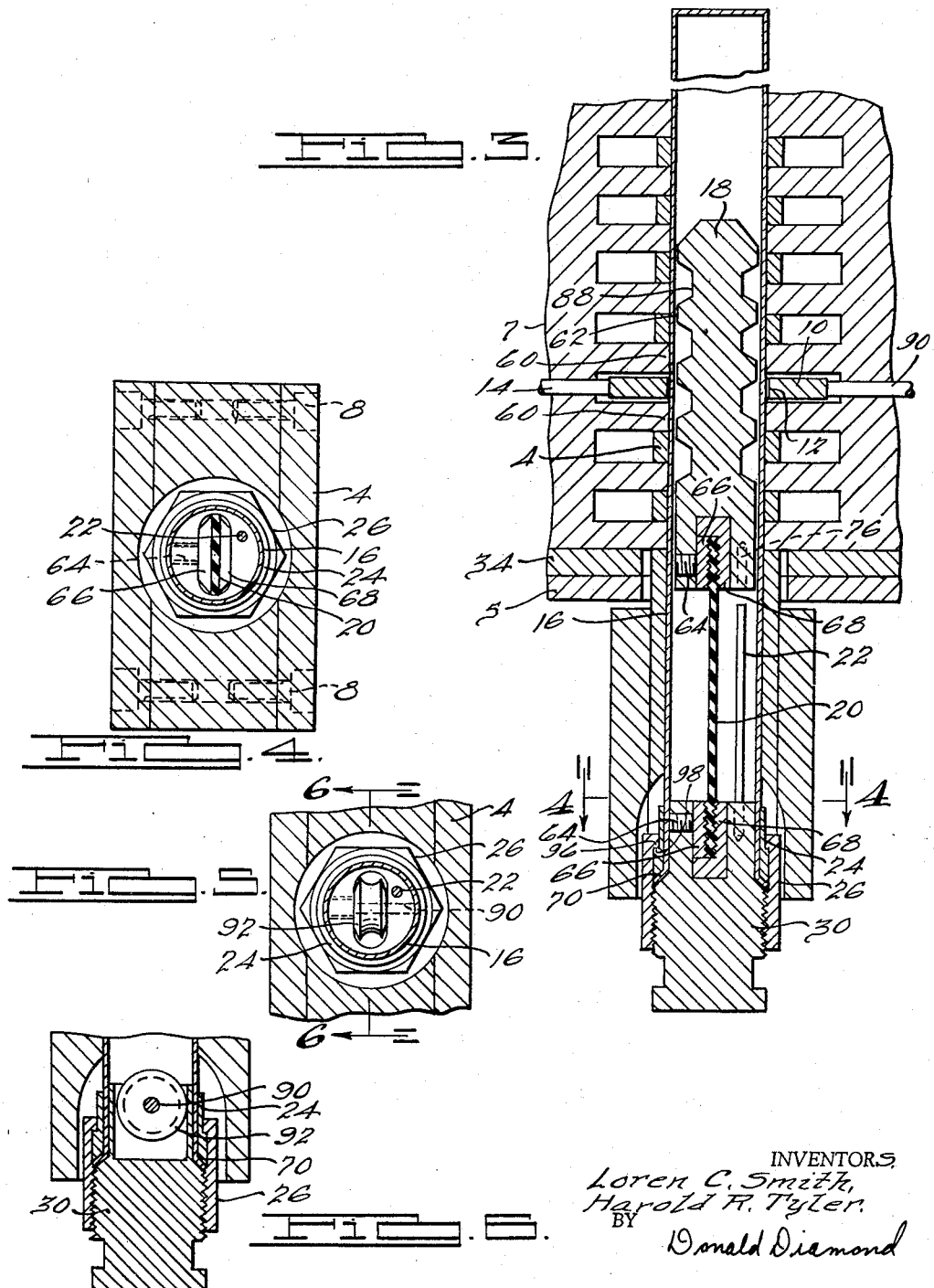

United States Patent Office 2,959,957
Patented Nov. 15, 1960

2,959,957
TENSILE TESTING APPARATUS

Loren C. Smith, Livonia, and Harold R. Tyler, Wyandotte, Mich., assignors to Wyandotte Chemicals Corporation, Wyandotte, Mich., a corporation of Michigan Filed Feb. 2, 1959, Ser. No. 790,419

20 Claims. (Cl. 73—95)

This invention relates to an apparatus for measuring the tensile strength of an elastomeric specimen and, more particularly, to an apparatus especially adapted for determining the tensile strength of an elastomeric specimen at elevated temperatures and in the presence of a test fluid.

The term "tensile strength" as used herein and in the claims is defined as the greatest longitudinal stress a substance can bear without tearing asunder and is usually expressed as the weight per unit area necessary to produce rupture.

With the advent of supersonic speeds, the operating temperatures of aircraft have increased because of increased power requirements and other factors. This has resulted in exposure of various aircraft parts, including parts fabricated from elastomeric materials, to various liquids at temperatures not previously encountered at subsonic speeds. As a consequence of this advance in aircraft technology, there has arisen a need for instrumentation which is capable of performing tests on the physical properties of elastomeric materials and analyzing the results of such tests when the elastomeric materials are exposed to petroleum base fuels and other fluids at elevated temperatures.

The prior art discloses several systems for determining the tensile strength of various materials. These systems generally employ weights, hydraulic sensing elements or electronic force transducers to measure the tensile load being applied to the test specimen. These existing systems are, in general, unsatisfactory for this problem of high temperature liquid immersion testing because the tensile load measurements must be made with the sample inside a pressure vessel. These existing systems, if used, would have to be applied through a sliding seal in the pressure wall. The possibility of measuring the tensile load through a sliding seal was found to be impractical because the force of friction was not only significant in magnitude, but erratic.

In the pending application of Loren C. Smith, Serial No. 659,282, a tensile testing apparatus is disclosed which overcomes the problems which would be encountered if the tensile testing apparatus of the prior art were employed to determine the tensile strength of elastomeric specimens at elevated temperatures and in the presence of a fluid environment. In accordance with a preferred embodiment of the invention disclosed therein, provision is made for suspending an elastomeric specimen between holders in a confined space to which a test fluid may be admitted and in which the specimen may be heated to the desired testing temperature. The specimen is associated with a flexible pressure-sensitive partition which separates a pressure sensing fluid from the test fluid. Suitable means are provided for externally applying a tensile load of desired magnitude to the specimen. The tensile load, when applied, is transmitted through the specimen to the flexible pressure-sensitive partition thereby causing a change in the lateral position of the partition. The pressure sensing fluid disposed within the pressure-sensitive partition responds to this change in position and this response, represented by difference in pressure, is directly proportional to the tensile load being applied.

In the apparatus disclosed by Smith, the tensile load is applied externally to a pulling member which passes through an O-ring seal and which is connected to a suitable specimen holder. It has now been found that certain test fluids such as high energy liquid fuels are highly corrosive to the O-ring fluid seal. In addition, the corrosiveness of these fuels to the O-ring seal is accelerated at the elevated temperatures employed in carrying out the test. The degradation of the O-ring seal by the test fuels is particularly disadvantageous and hazardous because it permits hot high energy liquid fuels to escape from the testing chamber.

An object of this invention is, therefore, to provide a new and improved apparatus for determing the tensile strength of elastomeric specimens. Another object of this invention is to provide a new and improved apparatus for determining the tensile strength of elastomeric specimens in a test fluid at elevated temperatures. A still further object of this invention is to provide an apparatus for determining the tensile strength of an elastomeric specimen at elevated temperatures and in the presence of a test fluid wherein the necessity for applying a tensile load to the specimen through a sliding O-ring seal is eliminated. A still further object of this invention is to provide a tensile testing apparatus for determining the tensile strength of an elastomeric specimen wherein magnetic means are employed to maintain one specimen holder, suspended within a nonmagnetic tube, in relatively fixed position with respect the magnet. A still further object of this invention is to provide a tensile testing apparatus in which a magnet having a plurality of concave poles of like polarity in vertical alignment with a plurality of like concave poles of opposite polarity is employed for maintaining a specimen holder, suspended within a nonmagnetic tube, in relatively fixed position with respect to said magnet.

Other objects will appear as this specification proceeds.

In accordance with this invention, an apparatus is provided for determining the tensile strength of an elastomeric specimen at elevated temperatures and in the presence of a test fluid, which comprises a tube containing removable closures at the ends thereof, first and second specimen holders disposed within said tube for suspending an elastomeric specimen therebetween, said first specimen holder being of magnetizable composition and in spaced relationship to said tube, magnetic means disposed without and in spaced relationship to said tube for maintaining said first specimen holder in relatively fixed position with respect to said magnet, said second specimen holder being associated with one end of said tube, means for applying a tensile load to said specimen and means for measuring the tensile load applied.

The apparatus provided in accordance with the invention is particularly advantageous because it permits tensile testing of an elastomeric specimen at elevated temperatures in the presence of a test fluid without employing sliding O-ring type elastomeric seals.

The test tube which can be employed is preferably an elongated cylindrical tube having a removable closure or test tube head at one end. However, a tube having a removable closure at each end is also suitable. The tube is constructed from nonmagnetizable materials and examples of materials of construction which can be used in fabricating this test tube include nonmagnetic stainless steel, aluminum, brass and high temperature resistant plastics. Since it is desirable that the tube be as thin as conditions permit, metals such as nonmagnetic stainless steel are preferred as the materials of construction.

The elastomeric specimen which is to be tested is suspended between two specimen holders. One specimen holder is preferably a highly permeable, cylindrically shaped, armature containing a plurality of grooves uniformly distributed along the axis thereof and concentrically disposed with respect to the major circumference of the armature and containing means disposed in one end thereof such as ribbed jaws or a bevelled edge spool for holding and positioning an elastomeric specimen. The major circumference of the armature is in minimum spaced relationship to the inside circumference of the nonmagnetic tube. The other specimen holder is associated with and preferably disposed within the removable test tube head. The specimen holder in the test tube head can take the form of either ribbed jaws or a bevelled edge spool for positioning and holding an elastomeric specimen. Ribbed jaws are used when dumbbell-shaped, flat-type elastomeric specimens are being tested and bevelled edge spools are employed when an endless band of elastomeric specimen is the subject of the test. A spacer pin disposed within the removable closure and which fits into a recess in the armature is employed to keep the armature in minimum spaced relationship with respect to the removable closure prior to initiating the test.

A magnet is employed to hold the armature in relatively fixed position with respect to the magnet while a tensile load is applied to the external surface of the removable closure such that the removable closure, together with the tube, moves away from the first specimen holder or armature. In a preferred form, the magnet contains a plurality of poles of like polarity in vertical alignment with a plurality of like poles of opposite polarity. In addition, the poles are, preferentially, concave such that the tube, when disposed therebetween is in minimum spaced relationship to the poles. The magnet can have any number of poles. However, the force exerted upon the armature or specimen holder is approximately proportional to the number of poles in the magnet and the number of grooves or projections in the armature. Thus, increasing the number of poles and projections increases the force between the armature and the magnet. Although a magnet containing any number of poles can be used, it is preferred to employ a magnet containing at least about five poles and an armature containing at least about five projections or grooves. A permanent magnet can be employed and gives good results. However, an electromagnet containing a plurality of turns of electrical wire is preferred because of the control which the operator has over this type of magnet.

Since the apparatus of the invention is particularly adapted for determining the tensile strength of an elastomeric specimen at elevated temperatures and in the presence of a test fluid, a heating jacket is provided for maintaining the test fluid at the desired temperature. Any suitable heating jacket can be employed for this purpose. Since the test tube is disposed within the heating jacket, it is preferable that the heating jacket contain perforations for permitting the concave poles of the magnet to project therethrough into proximate relationship with the test tube. This is particularly desirable since the maximum amount of force between the poles and the armature is obtained when the poles and armature are in minimum spaced relationship.

In view of the fact that the armature or first specimen holder is in minimum spaced relationship with respect to the nonmagnetic test tube, means are provided for keeping the armature in minimum contact with the inside wall of the tube while the tube is moving longitudinally with respect to the fixed position of the armature. A vibrator can be effectively employed for this purpose. A suitable vibrator consists of a striker which can take the form of a rectangular, thin-walled, preferably, nonmagnetic piece of metal having a cylindrical perforation in the center thereof slightly larger than the outside diameter of the nonmagnetic tube. A connecting rod is attached to one end of the striker and a guide rod is attached to the opposite end of the striker. The striker is mounted horizontally between the poles of the magnet in such manner that the connecting rod and guide rod are aligned in a direction parallel to the axis of the magnetic coil. The walls of the magnet are adapted to receive the guide rod and connecting rod. The connecting rod passes through the magnet wall and communicates with a suitable vibration source such as a pneumatic vibrator. The guide rod is supported by the wall of the magnet and in combination with the connecting rod holds the striker in relatively fixed vertical position. In operation, the striker reciprocates in a horizontal plane and strikes the tube alternately on opposite sides, thereby keeping the tube in minimum contact with the armature and magnetic poles.

Any suitable means for applying a tensile load to the elastomeric specimen in the test fluid can be employed. A suitable mechanism for applying a tensile load to the specimen can take the form of a rack and pinion attached to a pulling member which member is in turn associated with the test tube head. The pinion can be operated by a motor which transmits power thereto through a variable speed transmission, gear reducer and electric magnetic clutch. The tensile load being applied to the elastomeric specimen is continuously measured by employing a suitable force transducer in combinatiton with the pulling member. The force transducer converts the mechanical force into electrical impulses which are transmitted through an amplifier to a suitable recorder.

It will be understood that the foregoing general description and the following detailed description as well are exemplary and explanatory but are not restrictive of the invention.

Fig. 1 is a pictorial illustration of the tensile testing apparatus of the invention with portions of the heating jacket and test tube cut away to reveal the armature and the elastomeric specimen.

Fig. 2 is a transverse, partially schematic, section taken along the line 2—2 of Fig. 1.

Fig. 2A is an enlarged transverse section taken along the line 2A—2A of Fig. 1.

Fig. 3 is a longitudinal sectional view taken along the line 3—3 of Fig. 2.

Fig. 4 is a transverse section taken along the line 4—4 of Fig. 3.

Fig. 5 is a partial transverse section taken along the line 4—4 of Fig. 3 illustrating a rotatable roller in lieu of clamping jaws for suspending an elastomeric specimen in the test tube.

Fig. 6 is a partial longitudinal sectional view taken along the line 6—6 of Fig. 5.

Referring to Figures 1, 2 and 3 in more detail, an enclosed elongated test tube 16 has a flared opening at one end 70 for receiving a removable test tube head 30 which is particularly adapted for engaging the flared opening in fluid tight relationship. In order to provide a fluid seal at this fitting, a hex nut 26 having a flanged projection 96, engages the shoulder 98 of sleeve 24 and the corresponding threaded portion of test tube head 30.

A fixed jaw 68 and a movable jaw 66 are mounted in the test tube head for firmly holding the specimen 20 to be tested. The fixed jaw 68 is preferably integral with the test tube head. However, this jaw, as well as the movable jaw 66, can be removable. The surfaces of the jaws engaging the elastomeric specimen 20 are preferably ribbed in order to more effectively grasp and hold a flat-type elastomeric specimen. A set screw 64 urges the movable jaw 66 towards the fixed jaw 68. A spacer pin 22 is also mounted in the test tube head 30 for engaging the recess 76 disposed within the armature 18.

The armature 18 comprises a plurality of alternating major circumferences 62 and minor circumferences 88. Since twisting of the specimen tends to occur during elongation thereof due, in part, to the action of the vibrator, it has been found that this twisting of the specimen can be minimized or eliminated by slightly flattening opposite sides of the major circumferences 62 of the armature as illustrated in Fig. 2A. Fixed and movable jaws corresponding to the fixed and movable jaws in the test tube head are mounted in one end of the armature. A set screw 64 disposed within the armature 18 urges the movable jaw 66 towards the fixed jaw 68 in order to hold a flat-type elastomeric specimen in place. The major circumferences 62 of the armature 18 are in minimum spaced relationship to the nonmagnetic test tube 16. Since the tensile strength of the elastomeric specimen is being determined at elevated temperatures and in the presence of a test fluid, the tube is disposed within a perforated heating jacket 4 in which cartridge-type heating elements 2 are employed. The plates of the heating jacket 4 are held firmly in place by means of bolts 8.

An electromagnet 7 containing a plurality of poles 60 of like polarity in vertical alignment with a plurality of like poles 60 of opposite polarity is employed to hold the armature in relatively fixed position with respect to the magnet. The poles of the electromagnet project through the perforations of the heating jacket 4 and are preferably concave with respect to the test tube 16. Also, the poles are disposed so as to be within minimum spaced relationship with respect to the nonmagnetic test tube. We have found that a plurality of poles of like polarity in vertical alignment with a plurality of like poles of opposite polarity exerts a high axial force on an armature containing alternating major and minor circumferences disposed between said poles. Optimum results are obtained when the poles of the electromagnet are aligned such that they are in slight misalignment with respect to the major circumferences of the armature. The electromagnet which can be employed to hold the armature in relatively fixed position comprises a soft iron core 80 surrounded by a number of turns of wire 82. The exact number of turns of wire will depend upon the magnetic force required and the desired electrical characteristics. Top, bottom and back nonmagnetic cover plates 34 are employed to keep various parts of the apparatus in proper spaced relationship. The top and bottom cover plates 34 contain a plurality of large perforations 32 which act as cooling vents. A blower housing 36 containing a fan, not shown, is mounted on the underside of the electromagnet and forces air through the perforation 32 in the bottom cover plate 34. The cover plates 34 are held in fixed position by means of bolts 78.

Since the test tube 16 moves longitudinally with respect to the armature 18 which is held in relatively fixed position by means of the electromagnet 7 and since the armature is in minimum spaced relationship with respect to the test tube, it is desirable, therefore, to employ means for keeping the armature in minimum contact with the test tube. For this purpose, a vibrator is employed. The vibrator is a three-component member consisting of a striker, connecting rod and guide rod. The striker is a thin walled, rectangularly shaped piece of metal 10 having a cylindrical perforation 12 in the center thereof slightly larger than the outside diameter of the non-magnetic tube 16. A connecting rod 14 is attached to one end of the striker and a guide rod 90 is attached to the opposite end of the striker. The striker is mounted horizontally between the poles 60 of the electromagnet 7 and the end rods extend through perforations in the heating jacket 4 and through tubular perforations disposed within the magnet walls. The connecting rod passes through the magnet wall and communicates with a suitable vibration source such as a pneumatic vibrator 100. The guide rod 90 is supported by the magnet wall and in combination with the connecting rod holds the striker 10 in relatively fixed vertical position.

Mounting brackets 5 are bolted to the top and bottom nonmagnetic cover plates 34 of the electromagnet 7. These brackets contain aligned perforations through which passes the heating jacket 4. The mounting brackets aid in aligning and holding the heating jacket in place. A thermometer well 28 is provided for measuring the temperature in the vicinity of the tube during the testing operation.

A pulling member 38 is connected to the test tube head 30. The pulling member is actuated through a gear rack 42 and pinion 44 which are, in turn, put in motion by means of a motor 52 transmitting power through a variable speed transmission 50, gear reducer 48 and an electric magnetic clutch 46. A force transducer 40 is located intermediate the rack and pinion and test tube head. The force transducer continuously measures the force applied to the specimen and transmits the same through an amplifier 56 to a recorder 58. A range selector switch 54 is employed in conjunction with the force transducer, amplifier and recorder.

In addition to flat-type elastomeric specimens, the tensile testing apparatus of the invention can also be employed to determine the tensile strength at elevated temperatures and in the presence of a test fluid of an endless band of elastomeric material. A spool, such as is illustrated by reference numeral 92 in Fig. 5, can be used to hold the cylindrical-type elastomeric specimen. The spool is preferably mounted on a cylindrical roller 90.

In assembling and operating the apparatus of the invention, an elastomeric specimen, the tensile strength of which is to be determined at elevated temperatures and in the presence of a test fluid, is disposed between the fixed and movable jaws in the test tube head 30 and the armature 18. The set screws 64 are then adjusted such that the movable jaws press the specimen firmly against the fixed jaws and thereby hold the specimen fixedly in place. The spacer pin 22 mounted in the test tube head 30 is then inserted in the recess 76 disposed within the armature 18. By means of this spacer pin, a minimum spaced relationship is established between the test tube head and the armature 18. The fluid in which the specimen is to be tested is then poured into the test tube.

The test tube head 30, specimen 22 and armature 18 held in spaced relationship by the spacer pin 22 are inserted into the test tube at the flared opening 70. The sleeve 24 is urged toward the flared opening and a fluid-type seal is established between the test tube head and the test tube by means of hex nut 26. The test tube and its contents are placed in an oven in order to raise the temperature of the test fluid to the desired testing temperature, after which the tube is placed in the heating jacket 4 which holds the tube and its contents at the testing temperature. The tests are, in general, carried out at temperatures from about 200°–600° F., depending upon the test fluid used. The electromagnet, heating jacket and vibrator constitute a permanent assembly and the test tube is easily inserted into the heating jacket and into the cylindrical space formed by the concave poles 60 of the electromagnet. After attaching the pulling member 38 to the test tube head 30, the electromagnet 7 and vibrator are then actuated as well as the force transducer, amplifier and recorder. Elongation of the specimen is produced by actuating pulling member 38 such that the test tube head moves away from the armature which is held in relatively fixed position by the poles of the electromagnet. A motor 52 transmitting power through a variable speed transmission, gear reducer and an electric magnetic clutch operate a rack and pinion which, in turn, actuate the pulling member 38. The force being applied to the specimen through the rack and pinion is continuously measured by the force transducer 40 and transmitted through the amplifier to the recorder 58.

What is claimed is:
1. An apparatus for determining the tensile strength of an elastomeric specimen at elevated temperatures and in the presence of a test fluid, which comprises a tube containing removable closures at the ends thereof, first and second specimen holders disposed within said tube for suspending an elastomeric specimen therebetween, said first specimen holder being of magnetizable composition and in spaced relationship to said tube, magnetic means disposed without and in spaced relationship to said tube for maintaining said first specimen holder in relatively fixed position with respect to said magnetic means, said second specimen holder being connected to one end of said tube, means for applying a tensile load to said specimen and means for measuring the tensile load applied.

2. An apparatus in accordance with claim 1 wherein said magnetic means comprises a magnet containing a plurality of poles of like polarity in vertical alignment with a plurality of like poles of opposite polarity.

3. An apparatus in accordance with claim 1 wherein said magnet is an electromagnet.

4. An apparatus in accordance with claim 1 wherein said magnet is a permanent magnet.

5. An apparatus in accordance with claim 1 wherein said first specimen holder is an armature containing a plurality of major and minor circumferences.

6. An apparatus in accordance with claim 1 wherein said first specimen holder is in minimum spaced relationship with respect to the inside circumference of said tube.

7. An apparatus for determining the tensile strength of an elastomeric specimen at elevated temperatures and in the presence of a test fluid, which comprises a tube containing removable closures at the ends thereof, first and second specimen holders disposed within said tube for suspending an elastomeric specimen therebetween, said first specimen holder being of magnetizable composition and in minimum spaced relationship with respect to the inside circumference of said tube, a magnet disposed without and in spaced relationship to said tube for maintaining the first specimen holder in relatively fixed position with respect to said magnet, said second specimen holder being connected to one end of said tube, means for maintaining the elastomeric specimen and test fluid at elevated temperatures, means for maintaining the first specimen holder in minimum contact with the inside circumference of said tube, means for applying a tensile load to said specimen and means for measuring the tensile load applied.

8. An apparatus in accordance with claim 7 wherein said second specimen holder is integral with one of said tubular enclosures.

9. An apparatus in accordance with claim 7 wherein said specimen holders have striated jaws for holding a flat-type elastomeric specimen.

10. An apparatus in accordance with claim 7 wherein said specimen holders have cylindrical and rotatable rollers for positioning an endless band of an elastomeric specimen.

11. An apparatus in accordance with claim 7 wherein a vibrator, connected to said apparatus, maintains the first specimen holder in minimum contact with the inside circumference of said tube.

12. An apparatus for determining the tensile strength of an elastomeric specimen at elevated temperatures and in the presence of a test fluid, which comprises an enclosed tube containing a removable closure at one end, a cylindrical armature disposed within and in spaced relationship to said tube, said armature containing a plurality of grooves uniformly distributed along the axis thereof, said grooves being concentrically disposed with respect to the major circumference of said armature, first and second specimen holders disposed within said tube for suspending an elastomeric specimen therebetween, said first specimen holder being connected to said armature, said second specimen holder being connected to said removable closure, a spacer pin connected to said removable closure for maintaining a minimum spaced relationship between said removable closure and said armature, a magnet, said magnet containing a plurality of poles of like polarity in vertical alignment with a plurality of like poles of opposite polarity, said tube being disposed between said poles and in spaced relationship thereto whereby said armature is maintained in relatively fixed position with respect to the poles of said magnet, means for maintaining said elastomeric specimen and test fluid at elevated temperatures, a vibrator connected to said apparatus for maintaining the armature in minimum contact with the inside circumference of said tube, means for applying a tensile load to said specimen and means for measuring the tensile load applied.

13. An apparatus in accordance with claim 12 wherein said poles are in concave relationship with respect to said tube.

14. An apparatus in accordance with claim 12 wherein said magnet is an electromagnet.

15. An apparatus in accordance with claim 12 wherein said tube is in minimum movable relationship with respect to the armature.

16. An apparatus in accordance with claim 12 wherein said first specimen holder is an integral part of said armature and said second specimen holder is an integral part of said removable closure.

17. An apparatus in accordance with claim 12 wherein said removable closure is a flare-type assembly comprising a threaded test tube head adapted to receive a flared portion at one end of said tube, a flanged sleeve for urging said flared tube against the test tube head and a suitable fastener for removably securing the threaded test tube head to the tube.

18. An apparatus for determining the tensile strength of an elastomeric specimen at elevated temperatures and in the presence of a test fluid, which comprises an enclosed test tube containing a removable closure at one end, a highly permeable armature disposed within and in minimum spaced relationship to said test tube, said armature containing a plurality of grooves uniformly distributed along the axis thereof and concentrically disposed with respect to the major circumference of the armature, first and second specimen holders disposed within said tube for suspending an elastomeric specimen therebetween, said first specimen holder being mounted in said armature, said test tube having a flared opening at one end, said removable closure comprising a threaded test tube head and being adapted for receiving the flared portion of said test tube, a flanged sleeve for urging said test tube against said test tube head and a suitable fastener for threadedly securing the test tube to the test tube head, said second specimen holder being mounted within said test tube head, a spacer-pin mounted in said test tube head, a recess in said armature for receiving said spacer-pin, said spacer-pin maintaining a minimum spaced relationship between said test tube head and said armature, a magnet, said magnet containing a plurality of poles of like polarity in vertical alignment with a plurality of like poles of opposite polarity, said test tube being disposed between and in minimum spaced relationship to said poles, said poles being in concave relationship with respect to said test tube, a vibrator connected to said apparatus for maintaining said armature in minimum contact with the inside circumference of said tube, means for maintaining said elastomeric specimen and said test fluid at elevated temperatures, means for applying a tensile load to said specimen and means for measuring the tensile load applied.

19. An apparatus in accordance with claim 18 wherein said magnet is an electromagnet.

20. An apparatus in accordance with claim 18 wherein said specimen holders are adapted to accommodate a flat-type elastomeric specimen.

References Cited in the file of this patent

UNITED STATES PATENTS

| | | |
|---|---|---|
| 2,375,032 | Parke et al. | May 1, 1945 |
| 2,909,057 | Ottestadt et al. | Oct. 20, 1959 |